United States Patent [19]

Pietsch et al.

[11] Patent Number: 4,684,574

[45] Date of Patent: Aug. 4, 1987

[54] PROCESS FOR ENCAPSULATING DISSOLVED REACTANTS OF COLOR REACTION SYSTEM AND RESULTING CAPSULES

[75] Inventors: Gunther Pietsch, Isernhagen; Claus Hartmann, Hanover, both of Fed. Rep. of Germany

[73] Assignee: Papierfabrik August Koehler AG, Fed. Rep. of Germany

[21] Appl. No.: 708,284

[22] Filed: Mar. 5, 1985

[30] Foreign Application Priority Data

Mar. 9, 1984 [DE] Fed. Rep. of Germany ....... 3408745
Nov. 19, 1984 [DE] Fed. Rep. of Germany ....... 3442268

[51] Int. Cl.$^4$ .................. B01J 13/02; B32B 27/24
[52] U.S. Cl. .................... 428/402.2; 106/21; 264/4.1; 264/4.3; 264/4.7; 503/213; 425/5; 425/804; 427/151; 428/402.21; 428/914
[58] Field of Search ............. 264/4.1, 4.3, 4.7; 428/402.2, 402.21

[56] References Cited

U.S. PATENT DOCUMENTS

| 2,800,457 | 7/1957 | Green et al. ............ 264/4.4 X |
| 3,627,581 | 12/1971 | Phillips, Jr. ............ 428/402.21 X |
| 3,804,775 | 4/1974 | Shiozaki et al. ........... 428/402.21 X |
| 4,219,439 | 8/1980 | Miyake et al. ............ 428/402.2 X |
| 4,299,723 | 11/1981 | Dahm et al. ............ 264/4.7 X |
| 4,333,849 | 6/1982 | Pack et al. ............ 264/4.7 |
| 4,428,978 | 1/1984 | Jabs et al. ............ 264/4.3 X |

FOREIGN PATENT DOCUMENTS

| 2134326 | 10/1976 | Fed. Rep. of Germany . |
| 2306454 | 11/1977 | Fed. Rep. of Germany . |
| 2930409 | 2/1981 | Fed. Rep. of Germany . |
| 3346601 | 7/1985 | Fed. Rep. of Germany . |

Primary Examiner—Richard D. Lovering
Attorney, Agent, or Firm—Darby & Darby

[57] ABSTRACT

The invention relates to a process for encapsulating solutions of reactants of color reaction systems by means of conventional encapsulation processes, the reactant initially being dissolved in a solvent with a good dissolving power and immediately prior to emulsification or encapsulation, a non-solvent, which only dissolves the reactant to an insignificant extent, is admixed with the fresh solution obtained in a quantity which adjusts a supersaturated system, the capsulates obtainable as a result thereof, as well as their use with an encapsulated solution of a basic color former, which supplies a color by the reaction with acid reactants, in non-carbon paper.

19 Claims, 1 Drawing Figure

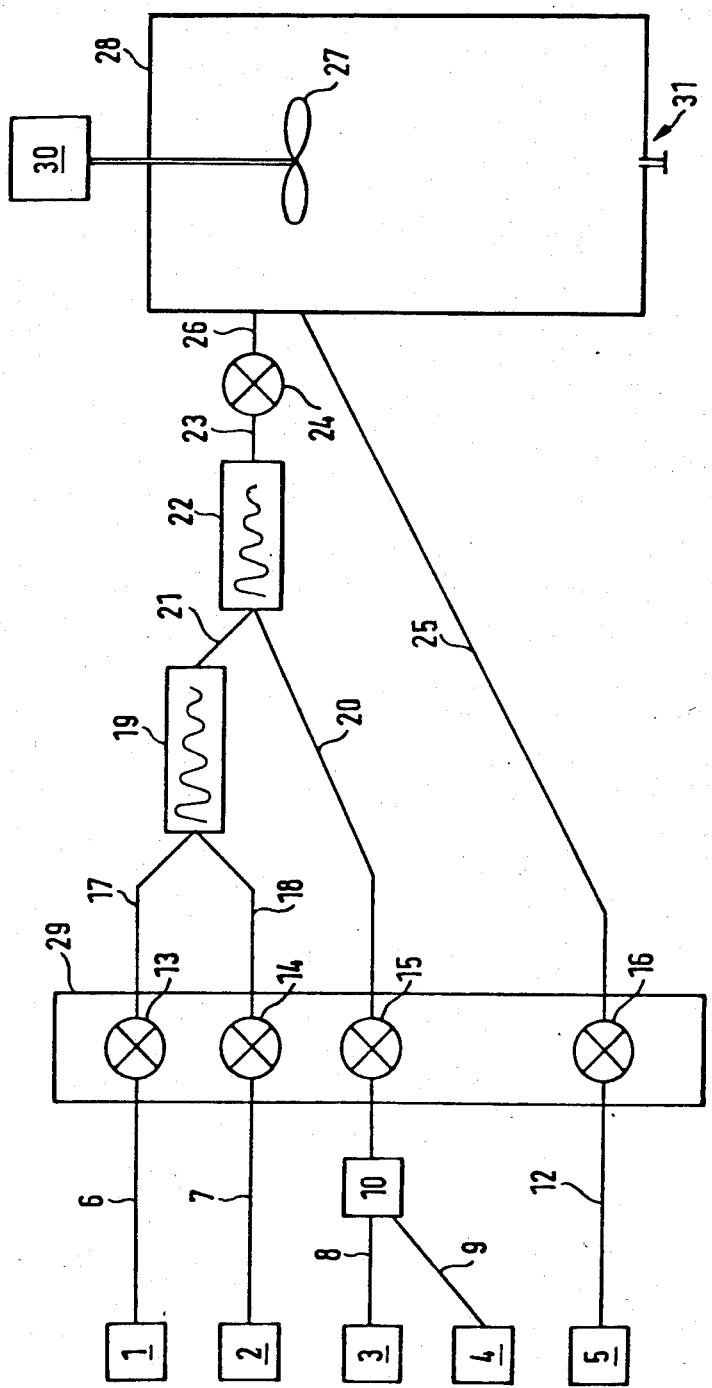

PROCESS FOR ENCAPSULATING DISSOLVED REACTANTS OF COLOR REACTION SYSTEM AND RESULTING CAPSULES

BACKGROUND OF THE INVENTION

The present invention relates to a process for encapsulating solutions of reactants of colour reaction systems by means of conventional encapsulation processes, capsules produced according to such a process and the use thereof in non-carbon papers.

In the case of commercial non-carbon papers, such as are described e.g. in German Pat. No. 2,151,178, as well as U.S. Pat. Nos. 3,418,250 and 3,016,308, the colour formers, e.g. in the form of crystal violet lactone, which during the printing process with an acid reactant supply a colour marking, are enclosed in microcapsules. If the acid reactant is also soluble, it can also be encapsulated. Encapsulation is intended to prevent the undesired premature colour reaction of the two reactants. Known colour formers are superior conventional aromatic systems. They are consequently also dissolved in aromatic solvents and undergo an encapsulation process, accompanied by the formation of a relatively hard capsule wall. The known aromatic solvents for aromatic colour formers, such as e.g. alkylated biphenyls, particularly butyl biphenyl, isopropyl biphenyl, amyl biphenyl, hexyl biphenyl and diisopropyl biphenyl, as well as alkylated naphthalenes, terphenyls and their derivatives, particularly partly hydrogenated terphenyls, diarylmethane and its derivatives, as well as diarylethane and its derivatives are relatively difficult to prepare and/or expensive. Numerous attempts have been made to take account of this disadvantage, in that e.g. in the case where isopropyl biphenyl, optionally with a proportion of polyisopropyl biphenyl and biphenyl, is used as a readily dissolving solvent of an aromatic colour former, with the colour former solution obtained is admixed a high-boiling, saturated aliphatic hydrocarbon oil, e.g. with a boiling range of 160° to 288° C. and consequently an inexpensive aliphatic solvent, as the diluent.

The use of aliphatic diluents consequently takes place because they are generally much cheaper than aromatic solvents, such as isopropyl biphenyl. The addition of the diluent reduces the solubility of the colour former in the solvent mixture. If crystal violet lactone is used as the colour former, in view of the practical requirements (adequate solubility, optimum colour formation, etc) isopropyl biphenyl and inexpensive aliphatic hydrocarbon oil can be used in a mixture with a weight ratio of approximately 2:1. Therefore, the inexpensive aliphatic portion represents a maximum of approximately 33% of the total mixture.

Attempts to raise the proportion of the inexpensive aliphatic non-solvent in the mixture with the readily dissolving solvent have failed, because the increase in the non-solvent proportion always led to the dissolved colour former being undesirably at least partly obtained in solid form and consequently the resulting dispersion (with suspended solid particles) was no longer usable for encapsulation by means of conventional encapsulation processes. It was found that if such suspensions were encapsulated, the capsules obtained did not lead to the sought effects in the colour reaction system and in particular did not give the desired colour intensity. Tests revealed that a solution of crystal violet lactone in a mixture of 15% of an aromatic solvent in the form of diisopropylnaphthalene, partly hydrogenated terphenyl or isopropyl biphenyl and 85% of a non-dissolving aliphatic hydrocarbon led to a substantial precipitation of the colour former within a very short time. However, if capsules for non-carbon papers were produced with such a dispersed medium, it was found that during the subsequent typing process that the precipitated main part of the colour former was withdrawn from the colour reaction mechanism, so that an unsatisfactory colour intensity resulted.

Thus, the attempts to use larger proportions of inexpensive non-aromatic, non-solvents, together with aromatic solvents in the encapsulation of colour former solutions have not been successful according to the prior art. In fact, it was assumed that research in this direction could not be successful.

However, it has surprisingly been found that the desired colour reactions of the colour former and its acid reactant in colour reaction systems take place to the desired extent, if e.g. an inexpensive non-solvent or the colour former and/or its acid reactant is used in a quantity such that even a highly supersaturated solution of the reactants is obtained, provided that that immediately after the preparation of such a supersaturated solution, whilst it is still in fresh form undergoes an emulsification and encapsulation process without delay. If such capsules are used in colour reaction systems, the colour reactions occurring during the printing process are surprisingly unimpaired e.g. in the same way as if a purely non-saturated aromatic system was enclosed in the capsules, instead of a supersaturated system.

SUMMARY OF THE INVENTION

The object of the present invention is therefore a process for encapsulating solutions of reactants of colour reaction systems by means of conventional microencapsulation processes, wherein the reactant is initially dissolved in a solvent with a good dissolving power and then, immediately prior to emulsification and encapsulation, a non-solvent, which only dissolves the reactant to an insignificant extent is admixed with the fresh solution in a quantity adjusting a supersaturated system.

The process according to the invention is of particular significance for the encapsulation of colour formers and colour reaction systems, particularly non-carbon papers, in which colour formers and acid reactants are located in spatially separated manner on the surface of two different, contiguous papers or on the surface of a single paper (autogenous papers).

The basic colour former can e.g. be the following compounds: diaryl phthalide, such as 3,3-bis-(p-dimethylaminophenyl)-6-dimethylaminophthalide (crystal violet lactone) and 3,3-bis-(p-dimethylaminophenyl)-phthalide (malachite green lactone), leucaramines, such as N-halophenyl, particularly N-(2,5-dichlorophenyl)-leucaramine, acrylauramines, such as N-benzoylauramine and N-acetylauramine, N-phenylauramine, α-β-unsaturated aryl ketones, such as dianisylidene acetone, dibenzylidene acetone and anisylidene acetone, basic monoazo dyes, such as p-di-methylaminoazobenzene-o-carboxylic acid (methyl red), 4-aminoazobenzene and 4-phenylazo-1-naphthalene amine, rhodamine-B-lactam, such as N-(p-nitrophenyl)-rhodamine-B-lactam, polyarylcarbinols, such as bis-(p-dimethylaminophenyl)-methanol, crystal violet carbinol, fluorans, such as monoaminofluoran, diaminofluoran and derivatives thereof, as well as spirans, such as benzo- or naphthospiropyran derivatives. These are so-called primary colour formers which, during the desired colour reaction, virtually instantaneously form a colour through reaction with the acid reactant. It is also possible to additionally use secondary colour formers, which delay the colour reaction and prevent a rapid fading of the colouring formed by the primary colour former. An example thereof is N-benzoylleucomethylene blue.

In colour reaction technology, particularly non-carbon paper technology, it is desirable in individual cases to also encapsulate in dissolved form the reactants of the colour former. In the case of conventional acid reactants, use is made of an aromatic solvent. The reactants include acid phenolic resins, particularly phenyl aldehyde resins, such as phenol formaldehyde resins. Preference is given to p-alkylphenol resins, which are e.g. described in DE-OS No. 1,934,457. The p-alkyl group preferably has 1 to 12 carbon atoms. However, it is also possible to encapsulate so-called "chelated" or "zinc-modified" phenolic resins, in which the phenolic protons are replaced by zinc. Such phenolic resins are e.g. described in U.S. Pat. No. 3,732,120. The following compounds can also be used, these also including compounds with an acid carboxyl grouping (also in the form of an anhydride structure): phenol acetylene polymers, maleic resins, partly or completely hydrolyzed styrene maleic anhydride copolymers and ethylene maleic anhydride copolymers, carboxypolymethylene and wholly or partly hydrolyzed phenyl methylene maleic anhydride copolymer, p-halophenol formaldehyde resins, as well as resins of the bisphenol A type. In addition, particularly acid monomeric phenolic compounds, such as e.g. bis-(p-hydroxyphenyl)-propane, naphthol derivatives, p-hydroxybenzoates and salicylic acid derivatives are also suitable.

The above-described acid reactants of colour formers are particularly preferred within the scope of the invention for the following colour formers: crystal violet lactone, orange, red and green/olive or black-reacting fluorans and benzo and naphtho-spiran compounds.

When reference is made within the scope of the invention to "solvents with a good dissolving power", then this dissolving power relates to the particular reactants to be encapsulated. If the reactant is dissolved by such a solvent in a quantity leading to a satisfactorily concentrated and encapsulatable solution, reference is then made to a "good dissolving power". Obviously, such a solvent must be of an inert nature in the system to be prepared, i.e. it must not undergo chemical changes itself or change the dissolved chemical compound. Any changes which occur must certainly only be negligible. The "non-solvent" used for the purposes of the invention is admittedly inert in the aforementioned sense, but would not alone form an adequately concentrated solution of the particular reactant to be dissolved. In fact, it would only insignificantly dissolve the same, e.g. approximately 0.1 to 0.3% or less, which is of substantially no significance with respect to the reactant concentration in the solution to be encapsulated. For example, in the case of most known colour formers, as well as their acid reactants, which regularly dissolve particularly well in aromatic systems, this would mean that the term "non-solvent" would cover non-polar aliphatic compounds which in fact do not dissolve these reactants from the practical standpoint. Thus, the terms "non-solvent" and "solvent with a good dissolving power" are always to be considered with respect to their dissolving power in connection with the compounds to be dissolved in the form of said reactants. Their dissolving power certainly differs to such an extent that the presently used definitions are also justified from this standpoint.

For the purposes of the invention, aromatic solvents have proved particularly advantageous as solvents having a good dissolving power for the reactants of colour reaction systems. These more particularly include alkylated biphenyls, alkylated naphthalenes, the alkyl radical preferably containing 3 to 10 carbon atoms, whilst in particular being the isopropyl, butyl, amyl, hexyl and diisopropyl radical, dialkyl phthalates, particularly dioctyl phthalate, but also simple aromatic compounds, such as benzene, alkylbenzenes (e.g. methyl benzene, ethylbenzene, propylbenzene, isopropylbenzene, amylbenzene and hexylbenzene), as well as halobenzenes, such as chlorobenzene. Particular reference is made to chlorinated paraffins as an example of non-aromatic compounds, which also constitute solvents with a good dissolving power without the sense of the present invention.

Particular significance is attached in this connection to the chlorinated paraffins described e.g. in British Pat. No. 1,296,477. According to the latter, chlorinated straight-chain paraffins with 6 to 18 carbon atoms and a degree of chlorination of 20 to 60% by weight are suitable as solvents for colour formers. Preference is given to those chlorinated paraffins having 12 to 14 carbon atoms and a degree of chlorination of 40 to 42% by weight.

According to the invention, a large number of non-solvents can be used for the particular reactant, particularly non-aromatic solvents, which occur in large quantities and are consequently inexpensive, or which are of a simple nature and can be consequently inexpensively manufactured. These more particularly include aliphatic and cycloaliphatic compounds. Aliphatic and cycloaliphatic petroleum constituents play a particular part, particularly raw gasoline or its partial fractions in the form of petroleum ether, light gasoline, ligroin, heavy naptha, kerosene, i.e. the second main fraction of petroleum undergoing fractional distillation containing paraffin hydrocarbon with 9 to approximately 20 carbon atoms, as well as gas oil (diesel oil, heating oil) as the third main fraction of the distillation and formed from paraffins with 12 to 19 carbon atoms, being used in diesel engines or for heating purposes. Natural gasoline is also suitable and represents the gasoline gas fractions present in natural gas and is removed from the latter by compression or absorption in oil.

The aforementioned aliphatic petroleum fractions are based on a petroleum mainly containing straight-chain paraffins. There are also petroleums (such as Soviet naphtha), which is formed up to 80% from cyclic hydrocarbons (naphthenes). The naphthene fractions can also be advantageously used for the purposes of the invention, their most important representatives being cyclopentane and cyclohexane (as well as their alkyl derivatives).

It is also possible to use petroleum fractions of such petroleums which, with respect to their composition, occupy a middle position between "paraffinic" and "naphthenic" petroleums.

As particularly inexpensive non-aromatic solvents, reference is made to the following commercial products in an exemplified manner: Exol D 80, Exol D 180/210, Exol D 140-170, Isopar L, Isopar M, solvent OP (all from Esso), Shellsol TD, Shellsol K, Shellsol H, Sinarol II, Flavex oil 909, Catenex oil 913 and Risella oil G05 (all from Shell), particular preference being given to Exol D 80 or Exol D 100.

The invention is particularly useful if the mixing ratio between the non-solvent and solvent with the good dissolving power, particularly in the form of an aromatic solvent is more than 1:1 (weight ratio), particularly more than 2:1 or even more than 3:1. It has surprisingly been found that the non-solvent proportion can even be approximately 85% by weight and in individual cases even more than 85% by weight of the complete dissolving system. This means that the price of the complete system is essentially determined by the inexpensive non-solvent and this constitutes the essence of the invention. It is decisive for the process according to the invention that the preparation of the dissolving system constituted by the non-solvent and solvent with a good dissolving power takes place as rapidly as possible and this freshly prepared supersaturated or even highly supersaturated solution immediately undergoes the emulsification or encapsulation process and at least prior to the occurrence of significant crystallization processes, which are undesired and have a disturbing influence. If encapsulation takes place from such a dissolving system, then capsules are obtained, which are equivalent to known capsules not produced from supersaturated systems, with respect to the suitability thereof in colour reaction systems.

The invention is not limited to specific encapsulation processes. In fact, it is possible to use known encapsulation processes, which in general ensure an adequately fast encapsulation of the freshly formed supersaturated dissolving system of the colour former or its acid reactant in emulsion form. In general, a capsule covering, although still liquid, is formed within a few seconds to a few minutes. However, encapsulation can be at an end within roughly only 2 minutes. The following measures, such as e.g. the hardening of the capsule wall are not critical for the purposes of the invention.

For the purposes of the invention, it is advantageously possible to use coacervation processes for encapsulating the aforementioned solutions of reactants of colour reaction systems. However, other processes not based on the coacervation principle are equally effective. Suitable processes will be described in greater detail hereinafter.

The coacervation process normally takes place e.g. as follows. Firstly, an aqueous solution at roughly 50° C. is prepared from ionizable hydrophilic colloid material (particularly gelatins, gum arabic, CMC, alginate or casein), choosing at least two colloids which can be electrically charged in opposite pole manner. When using gelatins on the one hand and e.g. gum arabic on the other, there are like electronegatively charged colloid ions above the isoelectric point of the gelatins (e.g. pH 8). The solution of the colour former to be encapsulated is now emulsified in said aqueous colloidal solution, so that an oil-in-water type emulsion is formed. The pH-value is then reduced to approximately 3.8, accompanied by the simultaneous dilution of the emulsion with water, in that strongly diluted, aqueous acetic or hydrochloric acid at 50° C. is added to the emulsion. This leads to an electropositive change reversal of the gelatin molecules, linked with a deposition of the liquid complex coacervate forming the capsule wall. On cooling the mixture from 50° C. to 6° to 8° C., gelatinization or setting of the capsule wall occurs. An additional chemical hardening of the capsule walls by cross-linking the gelatins by means of formaldehyde or glutaraldehyde leads to stable capsule dispersions. This process is described in detail in U.S. Pat. No. 2,800,457. It can be correspondingly used for encapsulating the acid reactant of the colour former.

However, as indicated, there are also processes, in which the microcapsules are prepared with an enclosed solution of a reactant of a colour reaction system without coacervation, solely by admixing a water-immiscible oily material, a solution of at least one thermoplastic resin and water. The water leads to the separation of the resin from the solution in the form of solid particles around a core of the aforementioned oily material. This process is described in U.S. Pat. No. 3,418,250. Other encapsulation processes relevant for the invention can be gathered from DOS No. 2,940,786 and DOS No. 2,652,875.

In the case of the process known from DOS No. 2,940,786, use is made of the condensation of melamine-formaldehyde precondensates and/or their $C_1$-$C_4$ alkyl ethers in water, in that the substantially water-insoluble material, which subsequently forms the core of the microcapsules is dispersed. Condensation takes place in the presence of dissolved polymers containing negatively charged ionic groups, at pH-values of 3 to 6.5 and temperatures of 20° to 100° C. The special feature of this process is that the polymer dissolved in water is a homopolymer or copolymer carrying sulphonic acid groups and having no phenyl and/or sulphophenyl groups, whilst having a K-value according to Fikentscher of 100 to 170, together with a viscosity of 200 to 5000 mPas in the case of a shear gradient of 489 $s^{-1}$ (measured in 20% by weight solution at 20° C.) and that the melamine-formaldehyde precondensate is added continuously or portionwise as a function of the condensation. This process is easy to control. Thus, by means of simple routine tests, it is easy to determine the optimum required water-soluble polymer quantity.

It is also advantageously possible according to the invention to use the process described in European Pat. No. 0,016,366, which specifically relates to the production of microcapsules containing the solution of a colour former. A solution of the colour former is enveloped in an organic solvent of capsules from a polyaddition product of a specific diisocyanate and a diamine. Firstly, accompanied by heating and stirring, a suitable diisocyanate is added to a solution of a colour former in an aromatic solvent. This organic phase is then added to an aqueous polyvinyl alcohol solution and emulsified on an ultrasonic blowpipe. A dilute aqueous amine solution is added to this emulsion, accompanied by stirring. The amine and diisocyanate quantities are in stoichiometric ratio. Following amine addition, stirring continues for a certain time at ambient temperature and then at elevated temperature.

It is obvious that the aforementioned processes can undergo modifications which are known to the Expert, without impairing their suitability for the purposes of the invention. Other processes, which are not described hereinbefore, could also be suitable for the purposes of the invention, provided that they ensure that the more or less strongly supersaturated fresh solution of the reactants of colour reaction systems, particularly non-carbon papers, is enveloped or encapsulated in a sufficiently short time to substantially ensure that there is no disturbing, premature crystallizing out of the dissolved reactants prior to encapsulation. As a guideline for the time between the preparation of the supersaturated solution and the formation of the individual droplets of the medium to be encapsulated with the start of enveloping, reference is made to a time of approximately 1 to 60 seconds. If the process is performed in an optimum manner, it is possible to drop below this time, which is advantageous. A short process duration is favoured in that e.g. the mixing of the starting materials, on the one hand the optimum highly concentrated solution of the particular reactant and on the other its non-solvent, takes place in a high-speed mixer, e.g. a stationary tubular mixer, which is positioned directly upstream of the emulsifying apparatus. Thus, the time-determining stage of the complete process would then be the encapsulating method. Conventional encapsulation processes regularly ensure a rapid performance of the process. Preference is given to continuous production processes.

The unexpected advantageous effect obtainable with the measures according to the invention can be explained as follows. Through the rapid emulsification with subsequent encapsulation of the fresh, supersaturated solution of the reactant, particularly the colour former for non-carbon papers, with a high non-solvent proportion, the crystallization process within the capsules is largely prevented. This could e.g. be due to the fact that the nucleation forces within the capsules or on the inner walls thereof are not sufficient. However, crystallization processes could take place, but lead to fine crystalline or colloidal precipitations corresponding in practice to a molecular dispersion. During the subsequent practical use, e.g. as capsules containing a solution of a colour former in non-carbon papers, this dispersion state does not have a disadvantageous effect during the typing process. However, it is stressed that this is only a possible and non-binding action mechanism. Other action mechanisms could also play a part. However, what is a fact is that, contrary to established Expert opinion, a technically advantageous and particularly economically favourable way has been taken for using inexpensive non-solvents by the present invention. This is not impaired by additionally encapsulating in conventional additives.

DESCRIPTION OF THE DRAWING AND SPECIFIC EMBODIMENTS

The invention is described in greater detail relative to a drawing and a number of examples. The drawing diagrammatically shows a continuously operating plant enabling the inventive process to be performed. Reference is made to the encapsulation of a colour former for non-carbon papers. Obviously, this also applies to the acid reactant of the colour former. However, fundamentally the process according to the invention can be used for other substances to be dissolved and encapsulated. According to the drawing, a solution of crystal violet lactone in isopropyl biphenyl (aromatic solvent) is located in container 1, whilst kerosene (aliphatic or non-aromatic solvent) is present in container 2. Container 3 contains an aqueous, colloidal gelatin solution, which will subsequently form the capsule wall material. Container 4 contains the second colloidal component in the form of an aqueous gum arabic solution. The colour former solution of container 1 passes via pipe 6 into the pump head 13 of dosing system 29 (dosing pump). Dosing system 29 has other pump heads 14, 15 and 16, as well as pump head 13. The non-solvent in container 2 is passed to the pump head 14 via line 7. From pump heads 13 and 14, the aforementioned materials of containers 1 and 2 pass via lines 17 and 18 into the static tubular mixer 19, which constitutes a flow tube. The delivery of pump head 13 is set in such a way that the mixing ratio of kerosene to colour former solution in the freshly prepared solvent mixture is 3:1 (weight ratio). This mixture is passed to a further static tubular mixer 22 via line 21. Simultaneously, line 20 supplies the capsule wall material to static tubular mixer 22 via pump head 15 of the dosing system 29. This is a mixture of the gelatin and gum arabic solutions from containers 3 and 4, which are homogeneously mixed by means of lines 8 and 9 in container 10. The mixture is then passed on in the aforementioned manner.

The coarse emulsion formed in the high-speed mixer 22 is then supplied via a line 23, as well as a fine emulsifying apparatus 24 and a line 26 to the coacervation container 28. Simultaneously, the additives necessary for coacervation are supplied from container 5 via line 12, pump head 16 and dosing system 29 and line 25 to the coacervation container 28. This is constituted by the aqueous acid solution which initiates coacervation. Initially, a system is formed in the coacervation container 28 with stirrer 27 which is driven by engine 30, in which the capsule wall material is still liquid, but there is already a liquid enveloping of the droplets to be encapsulated. The time for forming the liquid capsule covering is only a few seconds, e.g. 15 seconds.

After leaving coacervation container 28 via outlet 31, the removed material is cooled from 50° C. to approximately 6° to 8° C. As a result of this cooling the capsule wall material solidifies. In order that the approximately 3 to 10 μm diameter walls of the capsules formed are irreversibly given the desired hardness, the capsule dispersion obtained is hardened, e.g. by means of a formaline solution in per se known manner. The means used for said cooling and hardening are not shown in the drawing, because they are of a known nature.

Processes of the aforementioned type are known and are described many times in the literature, cf e.g. U.S. Pat. No. 2,800,457.

The invention will be described in greater detail hereinafter relative to examples. The materials referred to therein are treated in accordance with the previously described procedure relative to the drawing. Thus, the examples merely give the composition of the solution to be encapsulated in the form of an oil.

EXAMPLE 1

Oil to be encapsulated:

| | |
|---|---|
| 2% | crystal violet lactone |
| 0.6% | N—benzoyl leucomethylene blue, |
| 28% | partially hydrogenated terphenyl (Santosol 340) |
| 69.4% | aliphatic hydrocarbon oil (Shell Shellsol H) |
| 100.0% | |

EXAMPLE 2

Oil to be encapsulated:

| | |
|---|---|
| 2% | crystal violet lactone |
| 0.6% | N—benzoyl leucomethylene blue, |
| 40% | diisopropyl naphthalene, |
| 57.4% | technical white oil (paraffinic process oil type - Energol WT 1) |

-continued

| | |
|---|---|
| | 100.0% |

EXAMPLE 3

Oil to be encapsulated:

| | |
|---|---|
| 2.2% | 3-methylspiro-dinaphthopyran |
| 0.5% | N—benzoyl leucomethylene blue |
| 25.0% | isopropylbiphenyl (Tanacol PSG) |
| 72.3% | dearomatized, synthetic hydrocarbon oil (Shell Exsol D 200/240) |
| 100.0% | |

EXAMPLE 4

Oil to be encapsulated:

| | |
|---|---|
| 5% | colour former mixture, reacting black* |
| 15% | isopropylbiphenyl (Tanacol PSG) |
| 80% | synthetic hydrocarbon oil (Shell Exsol D 240/270) |
| 100.0% | |

| | |
|---|---|
| *2-octylamino-6-diethylaminofluoran | 3.0% |
| N—benzoyl leucomethylene blue | 1.2% |
| crystal violet lactone | 0.3% |
| 2-isobutyl-6-diethylaminofluoran- bis-[N—octyl-2-methyl-indolino-(3)]-phthalide | 0.2% |
| | 5.0% |

What is claimed is:

1. A process for preparing encapsulated preparations of components, which comprises:
    dissolving an effective amount for use in a color reaction system of at least one component selected from the group consisting of (i) color formers and (ii) acid reactants in a solvent in which said amount of said component is soluble, to form a component-solvent solution;
    admixing in said solution, in an amount sufficient to form a supersaturated solution with respect to said component, a non-solvent fluid in which said component is essentially insoluble; and without delay and while said supersaturated solution is fresh,
    emulsifying and encapsulating said super-saturated solution.

2. A process according to claim 1, wherein said solvent is selected from the group consisting of aromatic hydrocarbon solvents, chlorinated hydrocarbon solvents, paraffins and mixtures thereof.

3. A process according to claim 2, wherein said aromatic hydrocarbon solvent is selected from the group consisting of alkylated biphenyl, alkylated naphthalene, hydrogenated terphenyl, diarylalkane compounds and mixtures thereof.

4. A process according to claim 1 wherein said non-solvent is a non-aromatic hydrocarbon fluid.

5. A process according to claim 4, wherein said non-solvent is selected from the group consisting of aliphatic, hydrocarbon solvents, cycloaliphatic hydrocarbon solvents and mixtures thereof.

6. A process according to claim 1, wherein said solvent and said non-solvent are used in a weight mixing ratio of less than 1:1.

7. A process according to claim 1 wherein the component is a basic color former of the color reaction system.

8. A process according to claim 7, wherein said color former is selected from the group consisting of lactone derivatives, fluoran derivatives, phthalide derivatives, diphenylmethane derivatives, triphenylmethane derivatives, spiropyran derivatives and mixtures thereof.

9. A process according to claim 7 wherein said preparation further comprises a member selected from the group consisting of N-benzoyl leucomethylene blue, N-alkyl-carbazolyl-diphenylmethane derivatives and mixtures thereof.

10. A process according to claim 1 wherein the component is an acid reactant of the colour reaction system.

11. A process according to claim 10, wherein said acid reactant is an acid phenolic compound.

12. A process according to claim 1, wherein said encapsulating step comprises a coacervation process.

13. An encapsulated preparation of a component suitable for use as a reactant in a color reaction system, said preparation being prepared in accordance with the process of claim 1.

14. An encapsulated preparation of a component suitable for use as a reactant in a color reaction system, said preparation being prepared in accordance with the process of claim 2.

15. An encapsulated preparation of a component suitable for use as a reactant in a color reaction system, said preparation being prepared in accordance with the process of claim 4.

16. An encapsulated preparation of a component suitable for use as a reactant in a color reaction system, said preparation being prepared in accordance with the process of claim 6.

17. An encapsulated preparation of a component suitable for use as a reactant in a color reaction system, said preparation being prepared in accordance with the process of claim 7.

18. An encapsulated preparation of a component suitable for use as a reactant in a color reaction system, said preparation being prepared in accordance with the process of claim 10.

19. A process for preparing encapsulated preparations of components, which comprises:
    dissolving an effective amount for use in a colour reaction system of at least one component selected from the group consisting of (i) colour formers and (ii) acid reactants in a solvent in which said amount of said component is soluble, to form a component-solvent solution;
    admixing in said solution; in an amount sufficient to form a supersaturated solution with respect to said component, a non-solvent fluid in which said component is essentially insoluble; and without delay, and while said supersaturated solution is fresh,
    rapidly emulsifying and encapsulating said supersaturated solution.

* * * * *